(12) United States Patent
Usuda et al.

(10) Patent No.: US 6,188,802 B1
(45) Date of Patent: Feb. 13, 2001

(54) INFORMATION INPUT METHOD, INFORMATION INPUT SHEET, AND INFORMATION INPUT APPARATUS

(75) Inventors: Hiroshi Usuda, Chiba; Mitsuhiro Miyazaki, Tokyo, both of (JP)

(73) Assignee: Sony Corporation, Tokyo (JP)

( * ) Notice: Under 35 U.S.C. 154(b), the term of this patent shall be extended for 0 days.

(21) Appl. No.: 08/971,409

(22) Filed: Nov. 17, 1997

(30) Foreign Application Priority Data

Nov. 26, 1996 (JP) .................................................... 8-315289

(51) Int. Cl.$^7$ ........................................................ G06K 9/32
(52) U.S. Cl. ............................ 382/295; 382/296; 345/126
(58) Field of Search ..................................... 382/103, 296, 382/295, 141, 142, 143, 151; 235/494; 348/113, 116, 91, 95; 283/70; 345/126

(56) References Cited

U.S. PATENT DOCUMENTS

| | | | |
|---|---|---|---|
| 4,533,959 | * 8/1985 | Sakurai | 382/296 |
| 4,776,464 | 10/1988 | Miller et al. | 209/3.3 |
| 4,958,064 | 9/1990 | Kirkpatrick | 235/384 |
| 5,038,384 | * 8/1991 | Ohoba | 382/296 |
| 5,718,457 | * 2/1998 | Weinstock | 283/70 |
| 5,887,140 | 3/1999 | Itsumi et al. | 395/200.55 |

* cited by examiner

Primary Examiner—Yon J. Couso
(74) Attorney, Agent, or Firm—Limbach & Limbach, LLP

(57) ABSTRACT

An information input apparatus, an information input method, and an information input sheet which a user can easily operate without directly having to become aware of hardware are provided. An information input sheet includes a display area having an input information area and an identification area in which an identification code of the input information is provided. The identification code of the input information is provided in the display area as a target pattern having a rotation mode in which a code is defined by a directional orientation of the target pattern. An image pickup unit generates imaging information from imaging the information input sheet. The imaging information includes imaging information of the identification area of the information input sheet. Based on this imaging information of the identification area, the rotation mode of the target pattern, as recognized by an image recognition unit, is determined. The rotation mode specifies the identification code of the information input sheet. Information on the information input sheet is authenticated by authentication processing means.

9 Claims, 14 Drawing Sheets

CODE=1　　CODE=2　　CODE=3　　CODE=4

CODE=5　　CODE=6　　CODE=7　　CODE=8

{2, 5, 7, 4}   {1, 2, 4, 7}   {3, 7, 5, 1}   {7, 4, 2, 6}

{5, 8, 1, 4}   {6, 4, 8, 1}   {8, 7, 2, 3}   {6, 2, 3, 5}

ROTATED ICON CODE GROUP

INFORMATION INPUT METHOD, INFORMATION INPUT SHEET, AND INFORMATION INPUT APPARATUS

RELATED APPLICATIONS

The present application claims foreign priority under 35 U.S.C. Section 119(a)-(d) based on Japanese Patent Application 8-315289 filed in the Japanese Patent Office on Nov. 26, 1996.

BACKGROUND OF THE INVENTION

1. Field of the Invention

The present invention relates to a method and apparatus for entering data and/or control information into an electronic device. More particularly the present invention relates to a system and method for employing image recognition to enter information into a computer or other data and/or control system.

2. Description of the Related Art

Various new multimedia devices that combine the functions of existing audio-visual (AV), information, and communication devices have been proposed which enable input/output of multimedia information. Examples of such new devices include portable information terminals with communications capabilities, camcorders with communications capabilities, and personal computers with both communication capabilities and AV functions. In addition, systems designed to allow these new multimedia devices to communicate with each other via different types of networks are under development. Some of the different types of networks that are being used for inter-device communication include Ethernet local area networks (LANs), Token Ring LANs, ATM wide area networks (WANs), wire communication networks like public telephone networks, and wireless communication networks such as infrared communication systems, cellular telephone systems, and satellite communication systems.

Many of these new multimedia devices use the same conventional interfaces for inputting information as the existing AV, information, and communication devices. For example, both the conventional and new multimedia devices use keyboards, mice, touch panels, dedicated controllers and microphones.

As depicted in FIG. 15A, Bar codes are another example of a conventional means used for entering information into multimedia systems. A bar code typically includes a pattern of lines of varying thicknesses which represent binary codes. They are typically used for the machine identification of goods and other articles, or to specify a target object. Bar codes can be one or two dimensional. In other words, bar codes are arranged so that they can be scanned by a bar code reader in either one or two different scanning directions. FIG. 15B depicts a two dimensional bar code.

Unfortunately, operating conventional input interfaces is awkward and not suited to the human senses. This is not to say that existing devices themselves are not ergonomic, but rather that their method of operation is not intuitive and they typically require special training and practice before they can be used efficiently. For example, a keyboard can have many kinds of adjustments and special comfort features but until the user is taught and then practices touch-typing, even the most ergonomic keyboard is very difficult to use efficiently. The same is true for mice, touch panels, dedicated controllers and microphones used in conventional multimedia devices. Such input devices simply do not suit the human senses. In other words, users who are not accustomed to operating such devices do not intuitively understand the associated operating methods, and need special knowledge and training to become skilled in operating these devices.

In addition to not being easily recognized or read by humans, systems that use bar codes suffer from the added problem that there are only a finite number of codes for a given bar pattern display area. The more different articles that need to be identified by such a system, the more unique patterns are required. Eventually, either the number of bar code patterns has to be increased or the number of articles that can be identified must be limited. Increasing the number of patterns necessitates increasing the area of the bar pattern display on the article. This is not a preferred solution. For example, in the case of a product, the surface area of the article is finite and usually used for displaying other information. Further, adding more unique patterns by adding additional bars, which typically each only add two bits worth of information, increases the time required to recognize the bar code.

Thus, it is an object of the present invention to provide an information input apparatus, an information input sheet, and an information input method, which can be easily, efficiently, and intuitively operated without the user having to learn how to use or even become fully aware of specialized hardware.

It is a further object of the present invention to provide an information input apparatus, and an information input method, which enables a user to specify, associate, and reference information from among a large volume of data through a simple operation.

It is a still further object of the present invention to provide an information input apparatus, an information input method, and an information input sheet which enable a significantly increased the number of unique identifiers per unit area for use in the identification of goods and articles.

SUMMARY OF THE INVENTION

The above and other objects of the invention are achieved by the present invention of an information input method, information input sheet, and information input apparatus. The information input method according to the present invention includes the steps of appending a predefined target pattern having a rotation mode in which a code is defined by an orientation, to the surface of an object, and inputting code information corresponding to the rotation mode of the recognition target pattern by image recognition of the recognition target pattern.

According to the present invention, there is also provided an information input sheet including a display area having at least an input information area and an identification area. The input information area provides input information and the identification area provides an identification code for the input information. In the display area, the identification code of the input information is embodied as a recognition target pattern having a rotation mode in which a code is defined by an orientation characteristic of the target pattern.

According to the present invention, there is also provided an information input apparatus that includes an information input sheet including a display area having at least an input information area in which input information is provided and an identification area in which an identification code of the input information is provided. The identification code of the input information is embodied in the display area as a recognition target pattern having a rotation mode in which a code is defined by the directional an orientation of the target pattern. The information input apparatus further includes: an image pickup unit for imaging the display area of the information input sheet; an image recognition unit for performing image recognition of the recognition target pattern using imaging information of the identification area of the information input sheet imaged by the image pickup unit; and processing means for determining the rotation mode of the recognition target pattern recognized by the image recognition unit so as to specify the identification code of the information input sheet and authentication information from imaging the information input sheet.

These and other features and advantages of the present invention will be understood upon consideration of the following detailed description of the invention and the accompanying drawings.

DETAILED DESCRIPTION OF THE PREFERRED EMBODIMENTS

Figure 1:
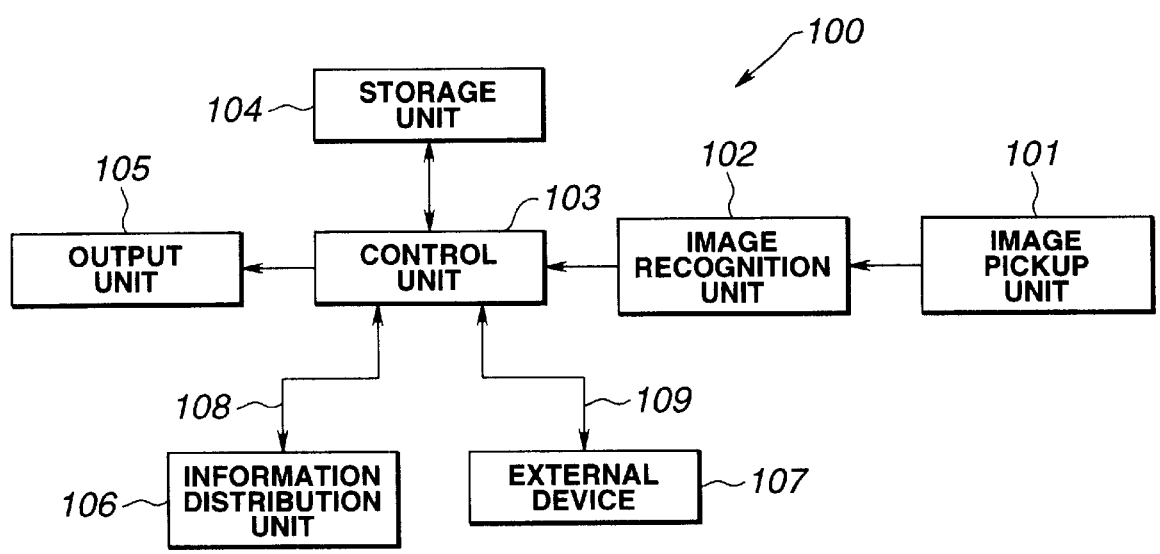
FIG. 1 is a functional block diagram depicting an embodiment of an information input apparatus according to the present invention.

Turning to FIG. 1, a preferred embodiment of an information input apparatus 100 according to the present invention includes an image pickup unit 101, an image recognition unit 102, a control unit 103, a storage unit 104 and an output unit 105. The control unit 103 is connected to an information distribution unit 106 via communication link 108 and to an external device 107 via communication line 109. Communication link 108 can be for example, a network, while communication line 109 can be for example, a home bus.

Figure 2:
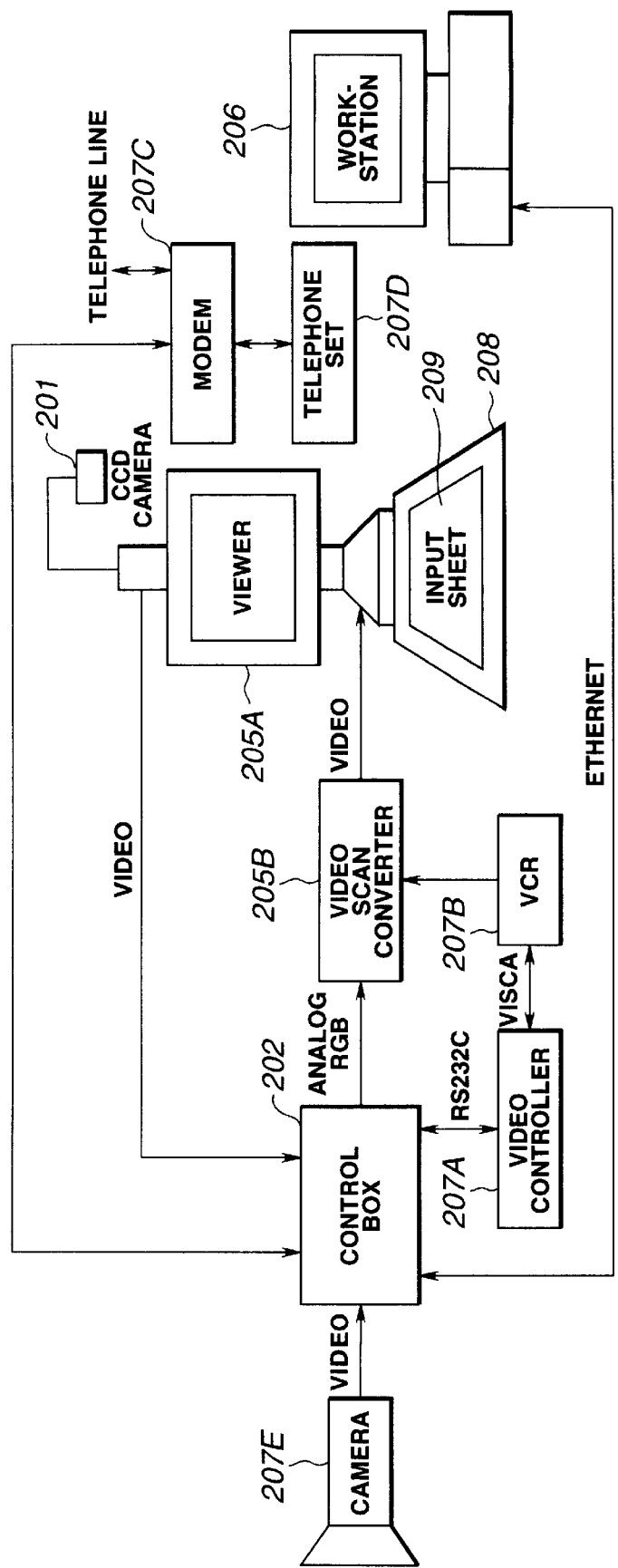
FIG. 2 is a block diagram depicting the structure of a multimedia system within which the information input apparatus of FIG. 1 is applied.

FIG. 2 depicts an application of the information input apparatus 100 of FIG. 1. In other words, FIG. 2 illustrates the present invention as it could be used in, for example, a multimedia system. Referring to both FIGS. 1 and 2, the image pickup unit 101 images a recognition target pattern appended onto an object surface, such as paper, and an access indication pattern made by a user with a finger or any other similar pointer. Specifically, the image pickup unit 101 is preferably embodied as sensitive digital camera such as a charge-coupled-device (CCD) video camera 201 as shown in FIG. 2 or a Quantum Well Infrared Photodetector (QWIP) video camera. The CCD video camera 201 is preferably located on top of a viewer 205A as in the multimedia system of FIG. 2. The CCD video camera 201 is focused to capture images of an input sheet 209 set on a medium base 208. The medium base 208 is adjacent to the viewer 205A which is disposed in an upright position so that the CCD video camera 201, located on top of the viewer 205A, can be focused on input sheet 209 on the medium base 208.

Figure 4:
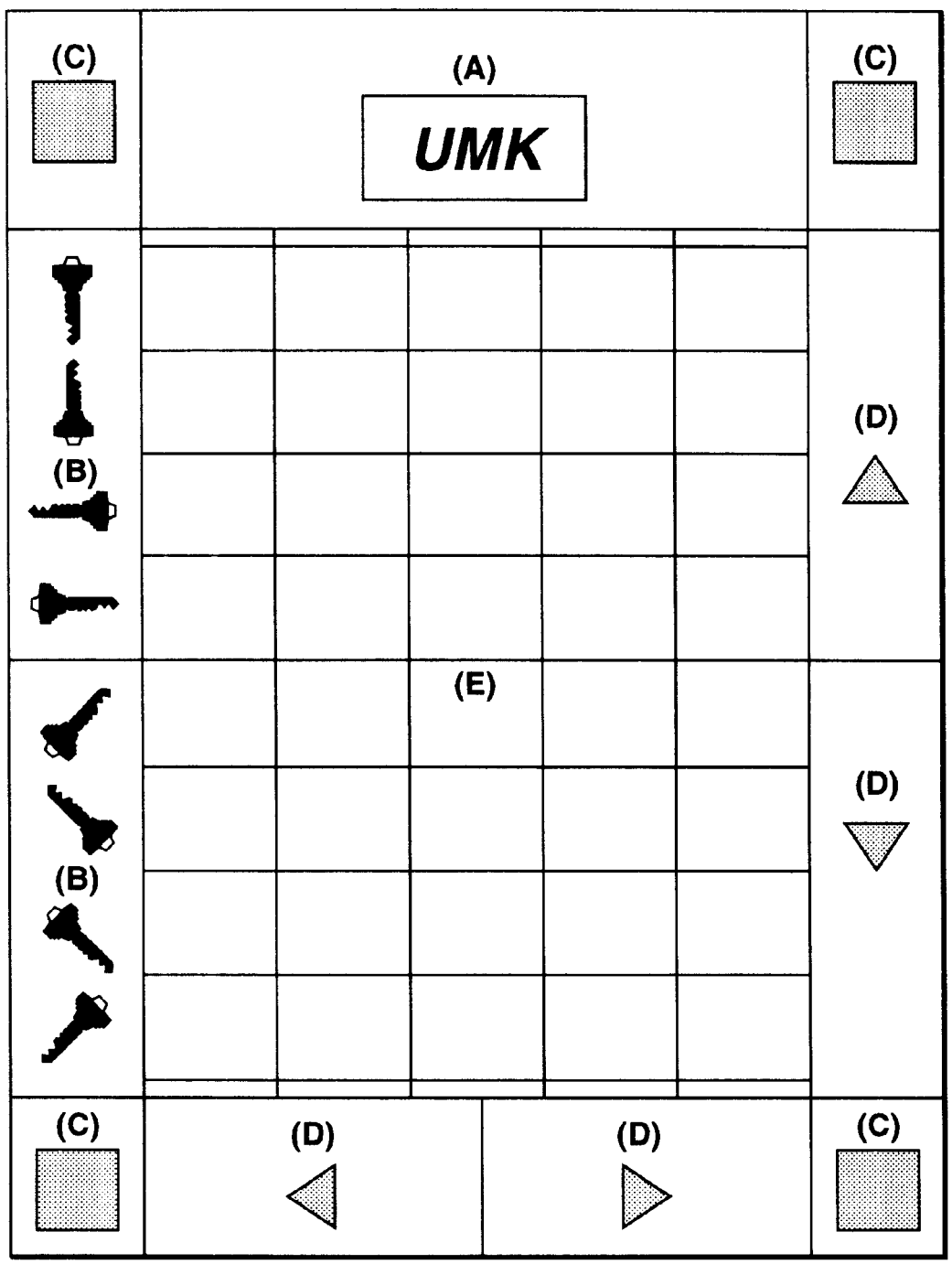
FIG. 4 is a plan view illustration depicting an example arrangement of an embodiment of an input sheet of the information input apparatus of FIG. 1.

In such an embodiment, the input sheet 209 serves as an information selection medium which is segmented into different category areas. The input selection sheet 209 can be made, for example, of paper or a thin plastic sheet. Turning to FIG. 4, an embodiment of an arrangement of the input sheet 209 of FIG. 2 is shown. The embodiment depicted in FIG. 4 illustrates an example input sheet 209 that includes five different category areas labeled A, B, C, D and E. Note that a particular category can include multiple distinct regions on the input sheet 209.

In the first category area A of the input sheet 209, an authentication icon is provided that can be used for authenticating that a particular plastic sheet or piece of paper is an input sheet 209 that will be permitted to be used with the information input apparatus 100 of the present invention. In other words, if the input sheet 209 includes an authentication icon in category area A that the information input apparatus 100 is able to authenticate, then the system will enable operation with that particular input sheet 209. Otherwise, the system will be disabled from operating with that particular input sheet 209. The combination of an authentication icon located in a predefined category area is referred to as a recognition target pattern.

In the second category area B of a preferred embodiment of an input sheet 209 there is an identification icon (or icons) for associating a particular sheet with stored or accessible electronic information. The identification icon is also referred to as a recognition target pattern. In the third category area C, an input sheet 209 position correction mark is provided. In the fourth category area D, a graphic for a user to indicate a selection is provided. Finally, in the fifth category area E, some form of a listing of the information content of the system is provided. The structure of an input sheet 209 and the arrangement of the graphics it provides is further described in grater detail below.

The image recognition unit 102 of FIG. 1 performs image recognition on image information provided by the image pickup unit 101. In the embodiment of FIG. 2, the CCD video camera 201 generates image information from imaging the input sheet 209. The image recognition unit 102 is embodied within a control box 202 in the multimedia system shown in FIG. 2. The control box 202 with the image recognition unit 102 receives the image information output from the CCD video camera 201. The image recognition unit 102 performs identification and authentication processing of the recognition target patterns contained within the image information received from the CCD video camera 201. Based on the identification and authentication processing, the image recognition unit 102 outputs an identification result and an authentication result to the control unit 103.

As will be described below in detail, once an association between an input sheet 209 and electronic information is made as a result of recognizing the recognition target pattern, the image recognition unit 102 proceeds to recognize an input/selection indication made by the user and then outputs a recognition result signal to the control unit 103.

Along with the image recognition unit 102, the control unit 103 is also provided within the control box 202 of the multimedia system shown in FIG. 2. The control unit 103 controls transmission and reception of information between the various other components. Based on the recognition result of the recognition target pattern by the image recognition unit 102, the control unit 103 determines whether the recognition target pattern is associated with information that is stored locally in the storage unit 104. If so, the control unit 103 accesses the associated locally stored information.

If the recognition target pattern is associated with information that is not stored locally, the recognition result is transmitted to the information distribution unit 106. In this case, the associated information is stored in the information distribution unit 106 or in an information processing unit located on an external communication network connected to the information distribution unit 106. The information distribution unit 106 accesses the associated remotely stored information.

In either case, once the associated information is located, the control unit 103 transfers a copy of the associated information into a temporary storage unit (not pictured) provided within the control unit 103. The associated information preferably includes several types of data. For example, information associated with an input sheet 209 preferably includes display information for providing the user feedback on the output unit 105, control information for controlling an external device 107, link information to locate other related information, and command configuration information for interpreting and using the input sheet 209.

Once the control unit 103 has a copy of the associated information in the temporary storage unit, authentication is performed for each input/selection indication image received from the image recognition unit 102. As the input/selection indication images are authenticated, a display screen on the output unit 105 is updated and control functions of the external device 107 are performed. In other words, representations indicating the functioning of these different operations and information distribution results are displayed on the output unit 105 as they are performed.

The above-listed types of information that are associated with different input sheets 209, or different areas of an input sheet 209, will now be explained in further detail. The display information includes characters, images, layout information, sound information and the like. Based on this display information, the control unit 103 creates displays on the output unit 105 and controls sound generation.

The control information includes control commands for controlling an external device 107 in response to the user making an input/selection indication on an input sheet 209. The control unit 103 controls the external device 107 based on the control information associated with the input sheet 209. For example, if the external device 107 is a video cassette recorder (VCR), the control information includes reproduction (play), stop, fast forward, rewind, and pause control information for controlling the operation of a VCR. When, for example, the user points to a graphic on the input sheet 209 that represents the play control information, the image pickup unit 101 sends image information to the image recognition unit 102 which, in response, recognizes the play input/selection indication image and sends a play command to the VCR.

The link information includes addresses for reading out other information when the user makes an input/selection indication. The links can point to information stored in the storage unit 104, the information distribution unit 106, or an external information processing unit connected to the communication network. Based on the link information, the control unit 103 accesses other additional information. For example, a Uniform Resource Locator (URL), as used on the Internet, may be used as link information in the present invention.

The command configuration information includes information indicating which functions are to be performed when a graphic within the D or E category areas of the information input sheet 209 is selected by the user. The process of a user selecting a graphic on the input sheet 209 is also referred to herein as a user input/selection indication. The command configuration information is in the form of a physical position on the input sheet 209 as selected by the user and a next processing command corresponding to that selected position. For example, the command configuration information could be a position coordinate and a processing command for executing the above-described control information or link information when the appropriate position coordinate is selected by the user.

In addition to the control unit 103 and the image recognition unit 102, the storage unit 104 is also provided within the control box 202 in the multimedia system shown in FIG. 2. The storage unit 104 stores information associated with the recognition target pattern. The information stored in the storage unit 104 includes the information for controlling the external device 107. This information can be retrieved from an external information processing unit connected to the network via the information distribution unit 106 or, for example, from a remote information source via a satellite communications system. By locating the storage unit 104 within the control box 202, the traffic on the network may be reduced and the response time to user input/selection indications may be shortened.

Figure 7:
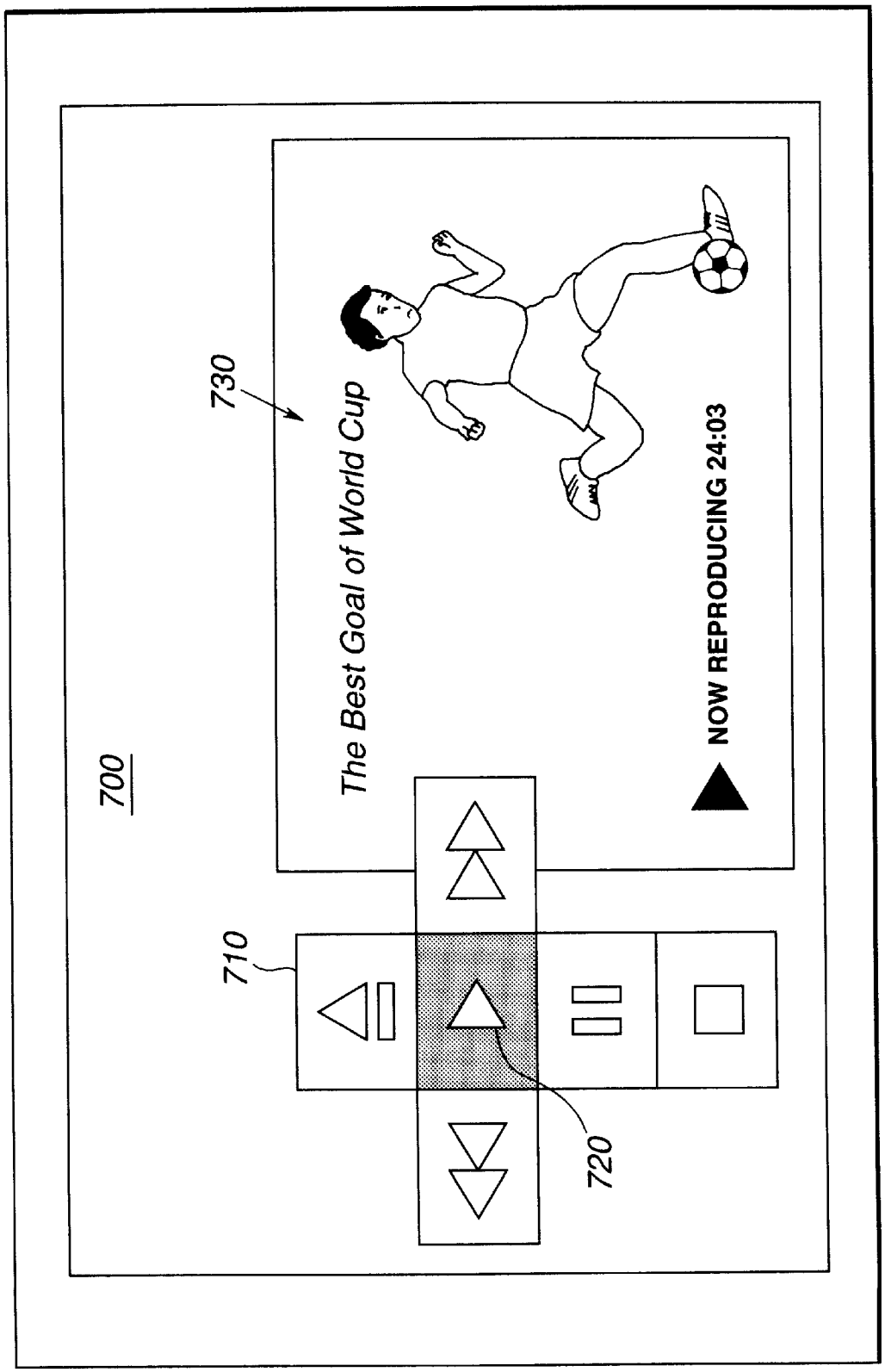
FIG. 7 is an illustration depicting an exemplary output display of an output unit of an embodiment of an information input apparatus according to the present invention using the input sheet of FIG. 6.

The output unit 105 preferably includes a display, a speaker, and/or a printer. Thus, the output unit 105 can provide sound and a visual display of both the function of the operation selected by the user and the information distribution results. FIG. 7 is an example of sample information output to an output unit 105 display screen. On the left side of the display screen 700 there is a graphic 710 illustrating the function of the operation selected by the user. Note that VCR controls are represented and the play command graphic 720 (a right pointing arrow) is darkened. This indicates the user selection of the play command. On the right side of the display screen 700 there is an image 730 output from the external device 107 which represents the information distribution results. Image outputs of various other devices under control of the system may also be synthesized and outputted to the output unit 105 as shown in FIG. 7. The output unit 105 of the multimedia system shown in FIG. 2 is embodied as a viewer 205A and a video scan converter 205B.

The information distribution unit 106 can be connected to the control unit 103 via wire communication networks such as Ethernet LANs, Token Ring LANs, or ATM WANs. Alternatively, wireless communication networks such as infrared, PHS telephone, digital cellular telephone, or satellite communication systems can be employed.

When the control unit 103 determines that the recognition result from the image recognition unit 102 requires information associated with a particular input sheet 209 that is not available locally in the storage unit 104, the information distribution unit 106 retrieves the associated information from an external information processing unit connected to the system via the communication network. In the multimedia system shown in FIG. 2, the information distribution unit 106 is embodied as a programmed workstation 206.

The external device 107 can be any number of different electronic devices that can be controlled by the control unit 103 in response to the input/selection indication. For example, in FIG. 2, the external device 107 includes an AV controller device 207A, a VCR 208B, a modem 207C, a telephone set 207D, and a camera 207E. The external device 107 could also include many other types of electronic devices, such as, computers and game machines. The external device 107 can be connected to the control unit 103 via wire communication lines or wireless communication systems.

Figure 3:
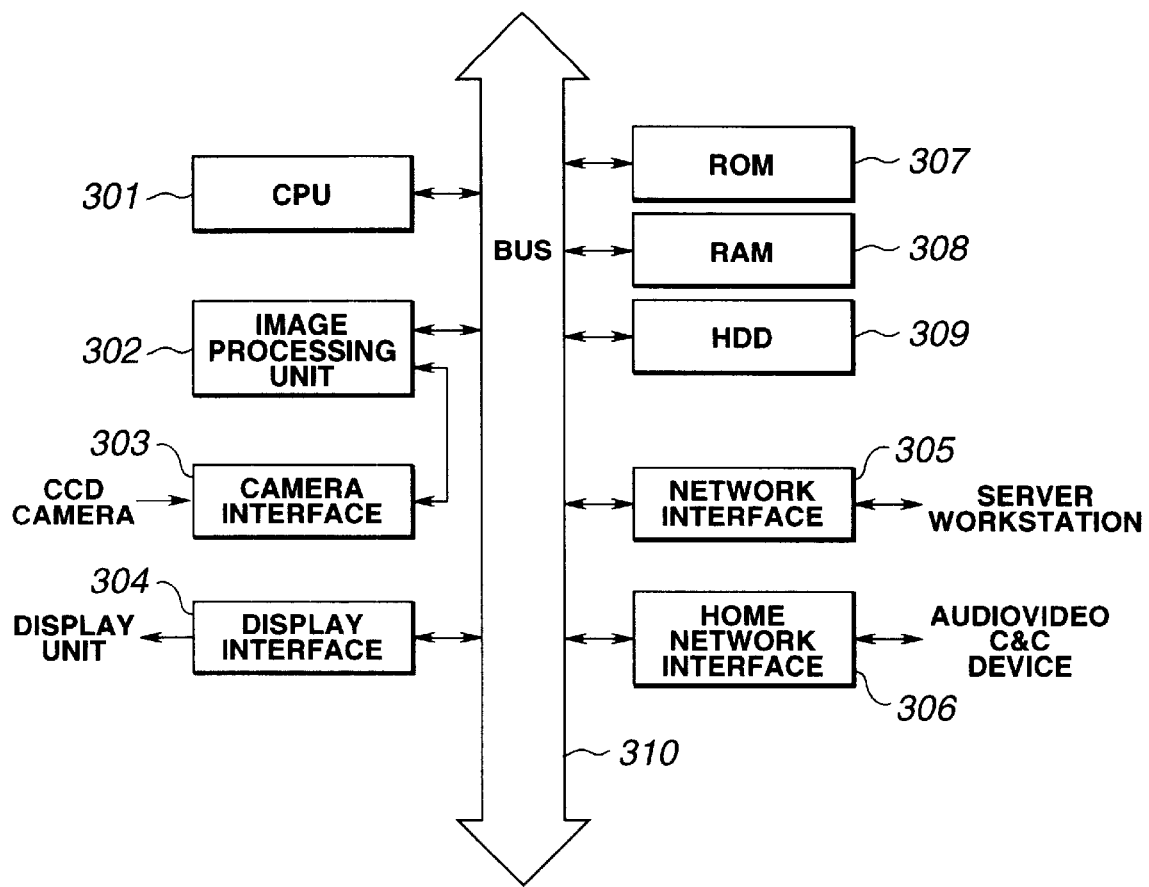
FIG. 3 is a block diagram depicting an embodiment of a hardware structure of a portion of the information input apparatus of FIG. 1.

FIG. 3 depicts an exemplary hardware embodiment of the control box 202 of FIG. 2. The control box 202 of FIG. 2 includes a central processing unit (CPU) 301, an image processing unit 302, a camera interface 303, a display interface 304, a network interface 305, a home network interface 306, a read only memory (ROM) 307, a random access memory (RAM) 308, a hard disk drive (HDD) 309. All of the components of the control box 202 can be interconnected via a bus 310. Alternatively, these components can be connected to each other via dedicated communications paths. For example, the camera interface 303 is shown connected directly to the Image processing unit 302 by a dedicated link. Likewise, the CPU can have a second separate bus for connecting to the ROM 307 and/or RAM 308.

The CPU 301 is adapted to control the control box 202 in accordance with a system program stored in the ROM 307 or a program developed in the RAM 308. The CPU 301 provides some of the functions of the image recognition unit 102 and some of the functions of the control unit 103 depicted in FIG. 1. In other words, both the image recognition unit 102 and the control unit 103 can be in part embodied as a CPU 301.

Programs and data necessary for the CPU 301 to perform various types of processing are stored in the ROM 307. The ROM 307 provides some of the functions of the control unit 103 of FIG. 1. The RAM 308 is adapted to develop and temporarily store programs and data necessary for the CPU 301 to perform various types of processing. The RAM 308 also provides some of the functions of the control unit 103 of FIG. 1. In other words, the control unit 103 can be in part embodied as a ROM 307 and a RAM 308 together with a CPU 310. The HDD 309 provides the functions of the storage unit 104 of FIG. 1 and thus, the storage unit 104 can be embodied as a HDD 309.

The image processing unit 302 receives image information from the CCD video camera 201 via the camera interface 303. Various types of image processing are performed by the image processing unit 302 such as image recognition processing. The image processing unit 302 provides some of the functions of the image recognition unit 102 of FIG. 1. The camera interface 303 receives image information from the CCD video camera 201 and then converts the image information to a signal format compatible with the image processing unit 302. The camera interface 303 then outputs the converted image information to the image processing unit 302. Thus, the image recognition unit 102 can be embodied in part as a camera interface 303 and an image processing unit 302 together with a CPU 301.

The display interface 304 receives display data processed by the CPU 301 and the image processing unit 302, converts the display data to signals compatible with the viewer 205A, and then outputs the converted signals to the viewer 205A. The display interface 304 and the viewer 205A provide some of the functions of the output unit 105 of FIG. 1. Thus, the output unit 105 can be embodied in part as a display interface 304 and a viewer 205A.

The network interface 305 provides a connection to the workstation 206, thereby enabling access to an external network. The network interface 305 and the workstation 206 provide some of the functions of the communication link 108 and the information distribution unit 106 of FIG. 1. Thus, the communication link 108 and the information distribution unit 106 can be embodied in part as a network interface 305 and a workstation 206.

The home network interface 306 provides a connection to the external device 107. The CPU 301 is thus able to control the external units 207A–207E via the home network interface 306. The home network interface 306 and the external units 207A–207E provide some of the functions of the communication line 109 and the external device 107 of FIG. 1. Thus, the communication line 109 and the external device 107 can be embodied in part as a home network interface 306 and a plurality of external units 207A–207E such as VCRs, modems, video cameras, etc.

The above described constituent components 301–309 are connected to one another via a bus 310. Together, they provide the various functions of the information input apparatus as described above with reference to FIG. 1.

The input sheet 209 imaged by the information input apparatus as described with reference to FIGS. 1 to 3 above is explained below in grater detail with reference to FIG. 4. As described above, the input sheet 209 is preferably segmented into the five category areas A, B, C, D and E.

In the first category area A of the input sheet 209, an authentication icon is provided for authenticating that a particular plastic sheet or piece of paper is an input sheet 209 that will be permitted to be used with the information input apparatus 100 of the present invention. As explained above with reference to FIGS. 1, 2 and 3, the authentication icon is provided as a recognition target pattern. The authentication icon in the category area A is imaged by the CCD video camera 201 and compared with comparative icon information stored in the ROM 307 by the CPU 301. When the CPU 301 is able to find a match between the authentication icon of the input sheet 209 and the comparative icon information stored in the ROM 307, operation proceeds to identification processing using the category area B. If no match exists, an error message is displayed on the viewer 205A.

Figure 5A:
FIG. 5A is an illustration depicting an example of code value assignments of rotated icon codes that can be used on the input sheet of FIG. 4.
Figure 5A:
Figure 5A:
Figure 5A:
Figure 5A:
Figure 5A:
Figure 5A:
Figure 5A:

In the second category area B, an identification icon (or icons) for associating the particular sheet with electronic information is provided as a recognition target pattern. The identification icon has a directionality and a predefined number of recognizably distinct orientations. For example, in the FIG. 4 embodiment of the input sheet 209, an icon resembling a key is used. The key shape has a narrow end and a wide end that gives it directionality and allows one to identify its orientation. Further, different orientations of the identification icon represent different values, codes or meanings. In the embodiment pictured in FIG. 4, each identification icon that serves as part of the recognition target pattern in the category area B, has eight distinct orientations. Thus, each identification icon can be oriented such that eight distinct code values can be represented based solely on the orientation of the icon. FIG. 5A illustrates an example of eight distinct orientations for the key shaped icon with one of eight distinct code values assigned to each orientation.

Through the use of just a few additional distinctly oriented icons together in a sequence, many more distinct codes can be represented. For example, using a sequence of four identification icons, each having eight distinct orientations, 4096 different code values can be represented. The number of values that can be represented by four icons with eight orientations is computed as follows:

$$(8 \text{ orientations})_{icon1} * (8 \text{ orientations})_{icon2} * (8 \text{ orientations})_{icon3} * (8 \text{ orientations})_{icon4} = 8^4 = 4096 \text{ values}$$

Figure 5B:
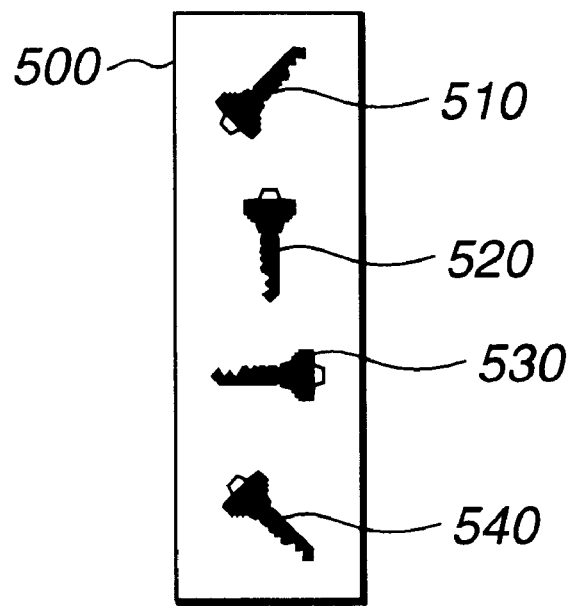
FIG. 5B is an illustration depicting a first example of rotated icon codes that can be used on the input sheet of FIG. 4.

Using the example orientation value assignments depicted in FIG. 5A, the ordered sequence of identification icons 500 shown in FIG. 5B represents a code value of "2574". That is to say, the first key icon 510 represents "2", the second key icon 520 represents "5", the third key icon 530 represents "7", and the fourth key icon 540 represents "4".

In the third category area C, a position correction marks are provided. The position correction marks are used for performing position correction of the image picked up by the CCD video camera 201.

In the fourth category area D, a graphics are provided for the user to perform a selection indication. By selecting a graphic in area D, the user can select information which is displayed on the viewer 205A but is not displayed in the category area E of the input sheet 209. That is, the category area D is used to make a selection indication whenever the selection information provided in the category area E of the input sheet 209 differs from the selection information displayed on the viewer 205A. This allows the information input apparatus 100 to dynamically add input selection options not present in category area E, via the viewer 205A.

For example, as shown in FIG. 4, when up, down, left, and right arrowhead graphics are provided in category area D, the user can choose an arbitrary arrowhead graphic in category area D to perform the shifting of a cursor and/or the determination of a menu selection on a menu screen displayed on the viewer 205A. Although the graphics provided in the category area D can be embodied as an up, down, left, and/or right arrow figures to provide cursor movement functions, the graphics are not necessarily limited to such arrowhead shaped figures and the functions are not necessarily limited to such cursor movement functions.

For example, if the input sheet is to be used as a common medium for controlling both a VCR and an audio system, graphics for controlling functions common to both external devices are provided. VCRs and audio systems frequently have functions in common such as, playback, stop, and record functions. Thus, by associating graphics in the category area D with command configuration information which includes embedded processing commands and position information, execution of the embedded processing commands is enabled. In the above-described example, the embedded processing commands include: upward, downward, leftward, and rightward cursor shift commands, and play, stop, and record commands. But for example, for a compact disc (CD) player, similar graphics could be used for commands such as forward within track, forward to next track, reverse within track, reverse to previous track, eject, stop, and change information display mode. Recall that command configuration information is copied into the temporary storage unit within the control unit 103 once an information sheet 209 is authenticated and identified.

The content of the substantive information available via the information input apparatus 100 is provided in the fifth category area E. This contents listing can be displayed in many different ways. For example, it can be displayed in the form of a table that enumerates general topics arranged in a subject matter based order, or as an image map analogous to a hyper-text transmission protocol (HTTP) image map used on World Wide Web (WWW) pages on the Internet, and/or as a detailed index that itemizes each an every bit of substantive information available in a alphabetical order. By viewing the information described in this category area E, the user can learn what information is accessible with the particular input sheet 209 currently imaged by the CCD video camera 201.

In addition, once a particular input sheet 209 is recognized by the information input apparatus 100 shown in FIG. 1, the user may select from the contents information provided in this category area E by simply pointing to the desired item of information within the contents information. The step of pointing provides an indication selection image pattern that can be recognized by the interface system 100. The indication of a particular selection is then provided to the control unit 103 which then can perform some predetermined processing.

Figure 6:
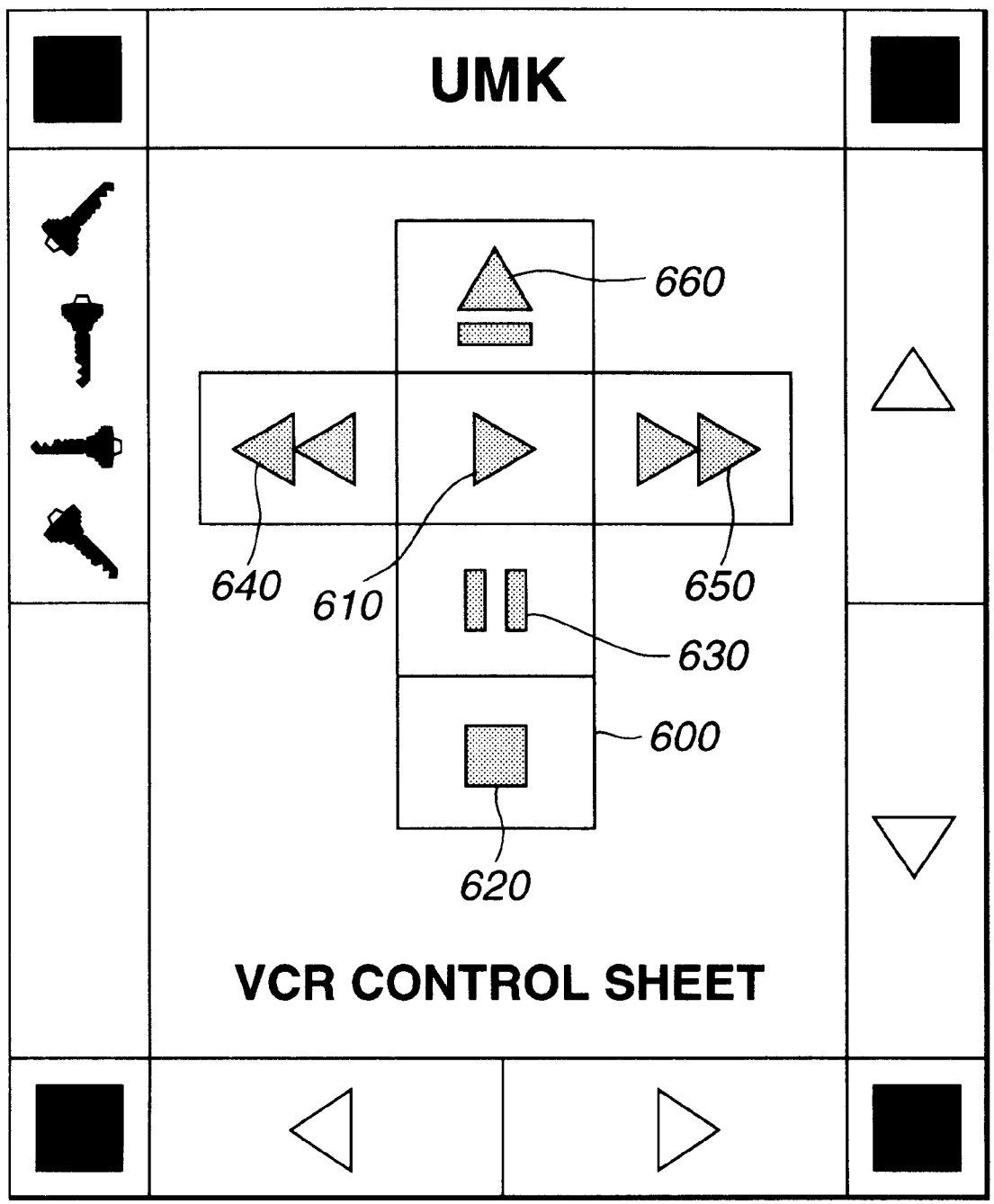
FIG. 6 is a plan view illustration depicting an example embodiment of an input sheet of FIG. 4 for controlling an electronic device having conventional video cassette recorder controls.

As an example, consider the input sheet 209 of FIG. 6. The category area E includes a graphic image map of VCR control buttons. The graphics 600 that represent the six different control buttons provided an intuitive set of controls that correspond to the VCR functions of play 610, stop 620, pause 630, rewind 640, fast forward 650, and eject 660. This example arrangement allows the user to easily operate the VCR using the six control buttons. Although the information contents described in the category area E has been explained using the control buttons for a VCR, one skilled in the art would realize that many different devices can be controlled using an appropriate input sheet 209 and, in particular, that the information contents are not necessarily limited to such VCR control buttons.

As a further example, the contents information in the category area E could be in the form of a series of menus. Thus, in response to the user pointing to a particular menu in the category area E using a finger, a subsequent display of menu items that correspond to the selected menu is displayed on the viewer 205A. Thus, by associating menus in the category area E with link information and command configuration information which includes embedded processing commands and position information, the display of link information and execution of the embedded processing commands is enabled. In this example a subsequent list of menu items are displayed on the viewer 205A in response to the user pointing to the location of the related initial menu on the input sheet 209. Once again, associated link information and command configuration information are copied into the temporary storage unit within the control unit 103 once an information sheet 209 is authenticated and identified.

In a multimedia system structured as described above, the image recognition unit 102 carries out identification processing for identifying the type of input sheet 209 being used. This happens once the input sheet 209 has been authenticated by authentication processing of the image of the input sheet 209 received from the CCD video camera 201.

The authentication processing is carried out by first performing pre-processing, such as, elimination of noise, variable density processing, and adjustment of threshold value. Next position correction is performed. The system then proceeds to extract the center of mass and contour of the authentication icon used as the recognition target pattern in the category area A at the upper center of the input sheet 209. Finally, the system attempts to match the image information with a stored the authentication icon pattern.

Figure 8:
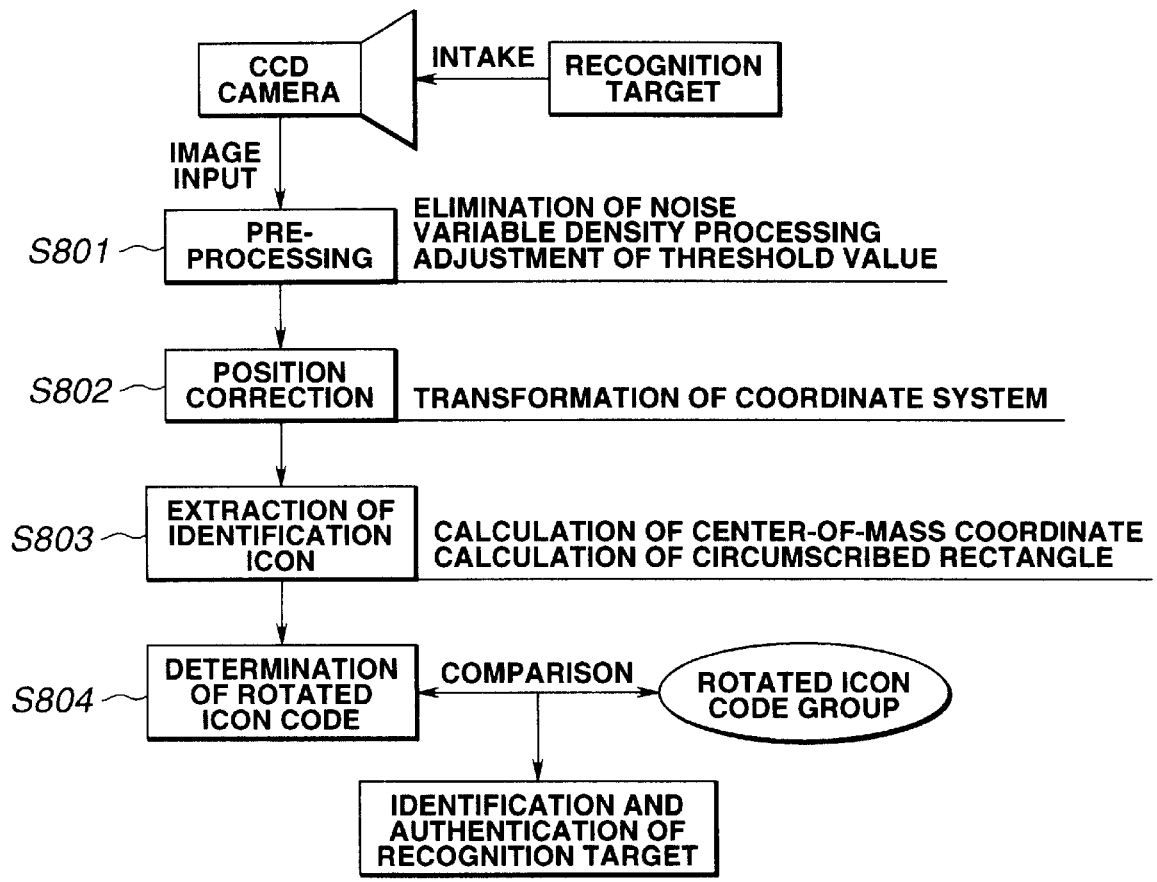
FIG. 8 is a flowchart depicting an embodiment of an identification processing method of recognizing a target with an image recognition unit of an embodiment of an information input apparatus according to the present invention.

Next identification processing takes place. For example, as shown in the flowchart of FIG. 8, pre-processing (S801) is first performed, such as, elimination of noise, variable density processing, and adjustment of a threshold value, with respect to the image information obtained as imaging output of the CCD video camera 201 focused on the input sheet 209. Then, position correction processing (S802) is performed by first detecting and measuring a positional shift based on the image information of the position correction mark provided in the category area C preferably located at the four corners of the input sheet 209. The position correction processing (S802) then performs a transformation of the coordinate system corresponding to the amount of the positional shift. Next, extraction processing (S803) of the identification icon provided as a recognition target pattern in the category area B of the input sheet 209 is carried out and determination processing (S804) of a rotated icon code is performed.

Figure 9:
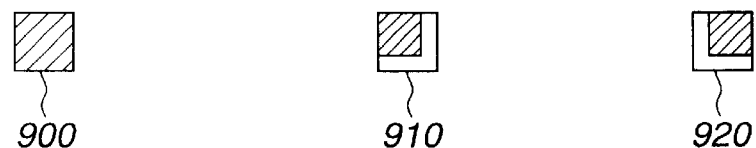
FIG. 9 is an illustration depicting the amount of shift detected during position correction by the image recognition unit of an embodiment of an information input apparatus according to the present invention.

In the position correction processing (S802), the positional shift from a reference position is detected based on the image information obtained as imaging output of the CCD video camera 201 focused on the category area C of the input sheet 209. As shown in FIG. 9, the system overlays a correction pattern on the position correction marks and detects the direction and magnitude of any position error. For example, coincidence 900 occurs if the sheet is properly aligned, shift to upper left 910 occurs if the input sheet 209 is too high and off to the left, shift to upper right 920 occurs if the input sheet 209 is too high and off to the right. Unless the coincidence 900 pattern is detected, position correction is then carried out by mathematically transforming the coordinate system of the image recognition in accordance with the direction and magnitude of the positional shift.

Figure 10:
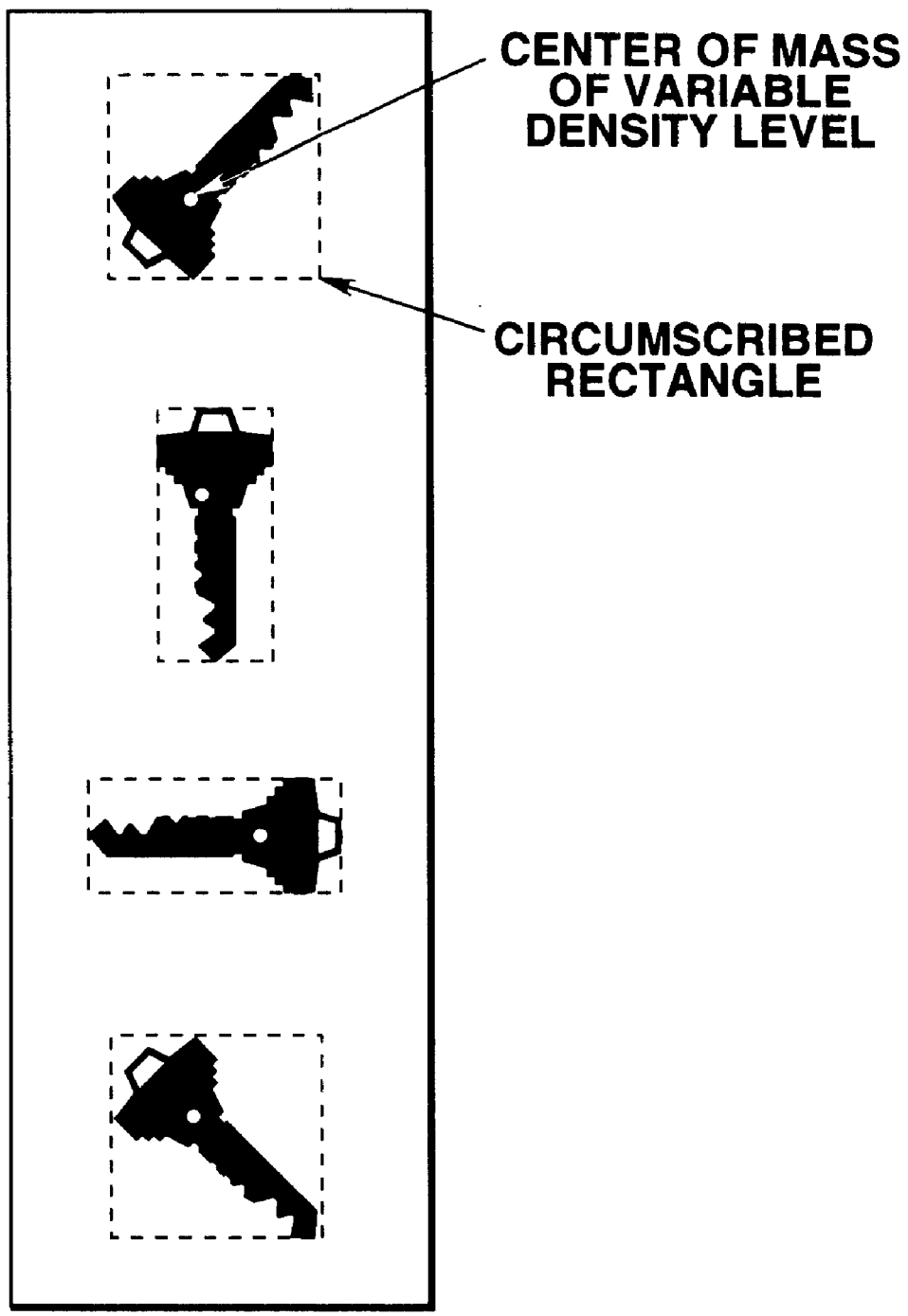
FIG. 10 is an illustration depicting the center of mass and a circumscribed rectangle of each icon extracted by rotated icon extraction processing in an embodiment of an identification processing method of recognizing a target according to the present invention.

In the extraction processing of the identification icon (S803), the center of mass of variable density level and a circumscribed rectangle are found for each icon from the image information obtained as imaging output of the CCD video camera 201 focused on the category area B of the input sheet 209, as shown in FIG. 10. In FIG. 10, the center of mass of each icon as determined by the identification icon extraction processing (S803) is indicated by a white spot and the circumscribed rectangle is indicated by a broken line.

In the rotated icon code determination processing (S804), one of eight different orientations of the icon are determined by referring to a direction characteristic table of the rotated icon. The direction characteristic table defines the eight different orientations in terms of two parameters; the center of mass and the aspect ratio of the circumscribed rectangle found in the identification icon extraction processing (S803). The direction characteristic table is expressed as shown below in Table 1. It is predetermined based on the conditions indicated by characteristics of each icon orientation. For example, the second row of the table is read as: "if the aspect ratio of the circumscribed rectangle is 2.5 or greater and the position of the center of mass is in the upper half of the circumscribed rectangle, the rotated icon is oriented downward." Based on the assignment of the icon's orientation with a code value as shown in FIG. 5A, the rotated icon is converted to a code. This processing is repeated for each of the four icons so as to determine a sequence of four codes.

TABLE 1

| Orientation of Icon | Characteristics |
| --- | --- |
| upward | aspect ratio 5:2, center of mass located in lower half of rectangle |
| downward | aspect ratio 5:2, center of mass located in upper half of rectangle |
| rightward | aspect ratio 2:5, center of mass located in left half of rectangle |
| leftward | aspect ratio 2:5, center of mass located in right half of rectangle |
| upper rightward | aspect ratio 1:1, center of mass located in lower left area of rectangle |
| lower rightward | aspect ratio 1:1, center of mass located in upper left area of rectangle |
| upper leftward | aspect ratio 1:1, center of mass located in lower right area of rectangle |
| lower leftward | aspect ratio 1:1, center of mass located in upper right area of rectangle |

Figure 11:
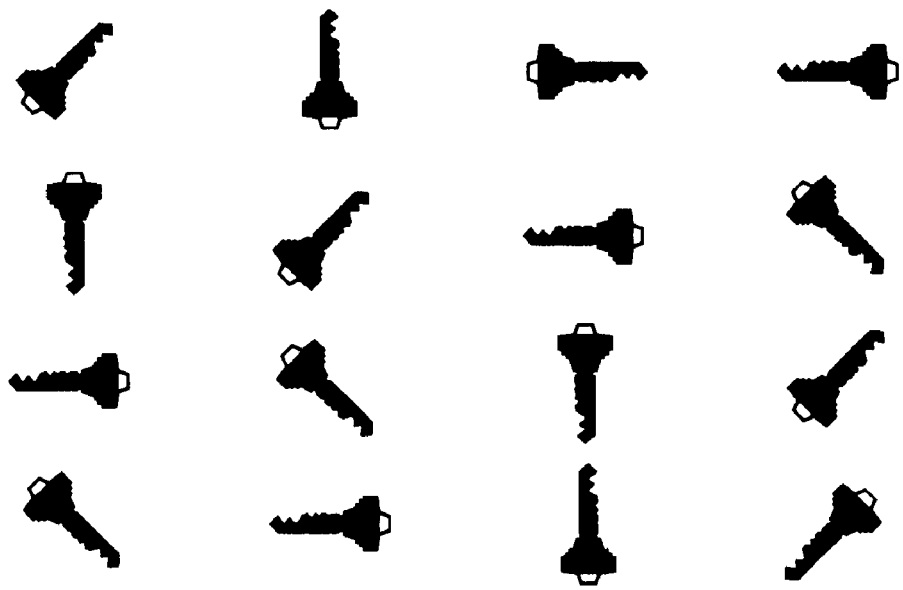
FIG. 11 is an illustration depicting a part of a pre-defined rotated icon code group used in rotated icon code determination processing in an embodiment of an identification processing method of recognizing a target according to the present invention.
Figure 11:
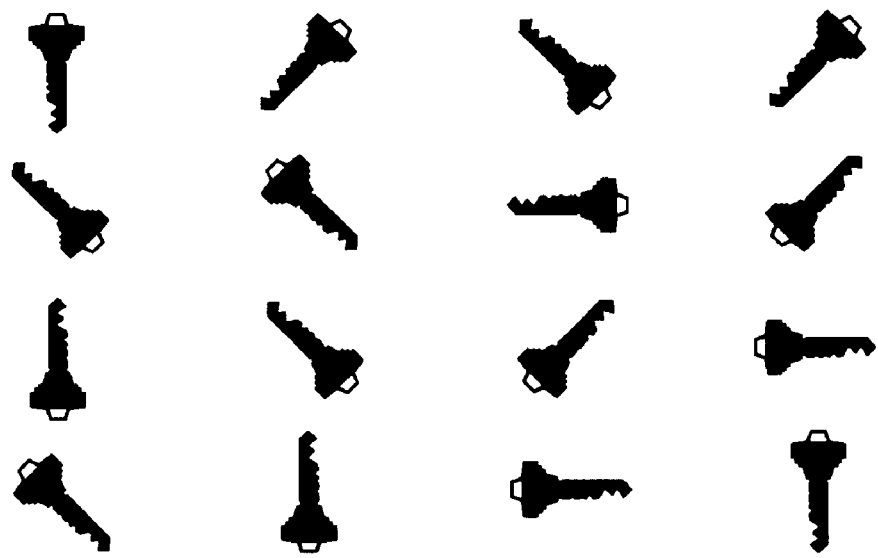

Next, the rotated icon code sequence found from the four rotated icons is compared with a pre-defined rotated icon code group as shown in FIG. 11. The best match between the rotated icon code sequence and one of the pre-defined code groups is selected as the rotated icon code of the input sheet 209. The best match is determined by finding the pre-defined rotated icon code group with the smallest sum of differences between the respective parts of the pre-defined rotated icon code group and the rotated icon code sequence. If the sum of differences of all the pre-defined rotated icon code groups exceeds a threshold value, the recognition target is not recognized as known code and is judged as unrecognizable.

As described above, the control unit 103 determines whether or not an association between the recognition result of the recognition target by the image recognition unit 102 and some of the information stored in the storage unit 104 can be made. If an association can be made, that information is accessed. That is, if association with information stored in the apparatus itself can be made, the associated information is immediately accessed. If there is no information associated with the recognition result from the image recognition unit 102 that is currently stored in the storage unit 104, the recognition result is transmitted to the information distribution unit 106.

In this case, the associated information is stored in the information distribution unit 106 or the information processing unit existing in the external communication network connected to the information distribution unit 106. Thus, after the information associated with the recognition result of the recognition target by the image recognition unit 102 is located by the information distribution unit 106, the control unit 103 reads the associated information into the temporary storage unit provided in the control unit 103.

Thus, when identification of an input sheet 209 and determination of its type is completed, processing is performed based on the information read into the temporary storage unit provided in the control unit 103. This all occurs in response to the input/selection indication from the image recognition unit 102.

Figure 12:
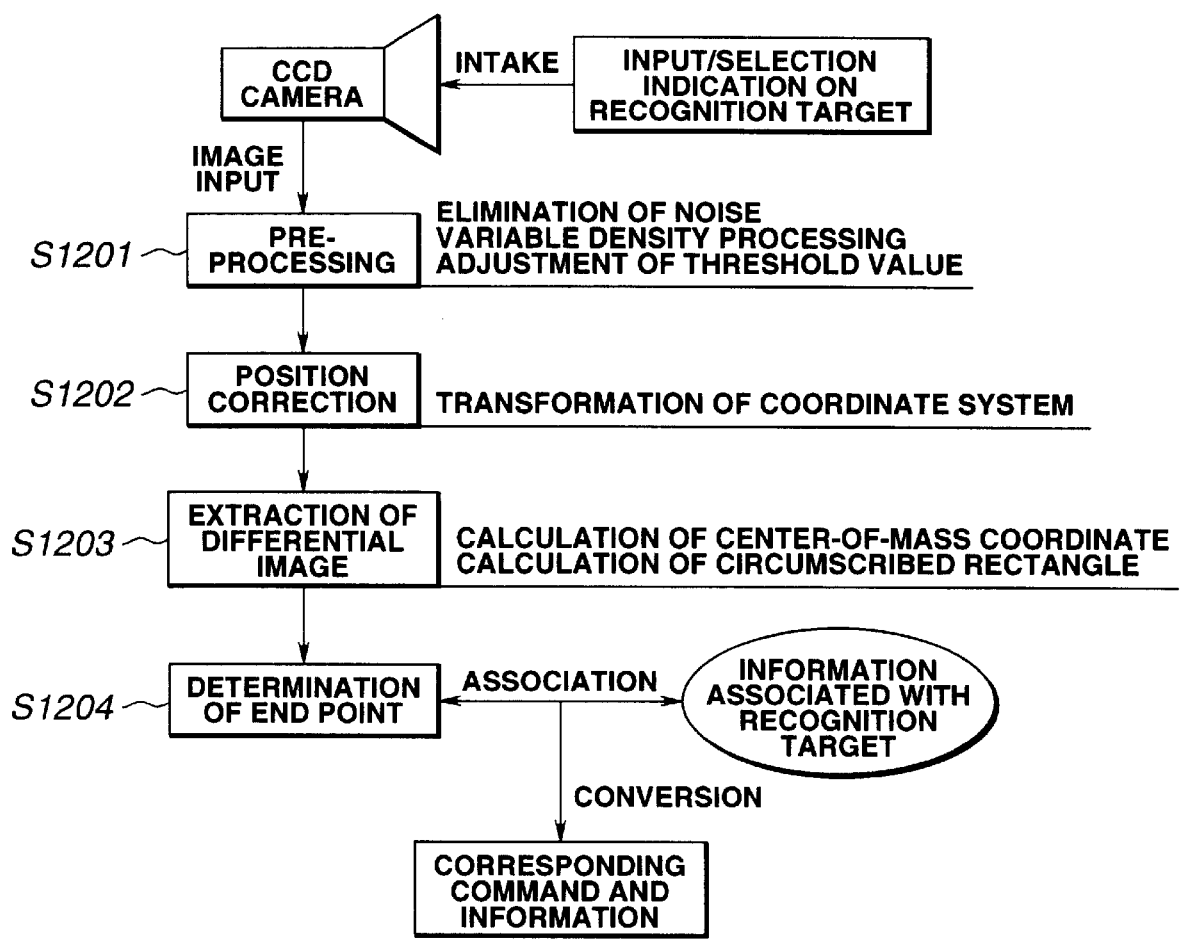
FIG. 12 is a flowchart depicting an embodiment of an input/selection indication processing method in an embodiment of an image recognition unit of an embodiment of an information input apparatus of the present invention.

FIG. 12 illustrates an embodiment of the steps used in the input/selection indication processing by the image recognition unit 102. Pre-processing (S1201) is first performed. This includes functions such as, elimination of noise, variable density processing, and adjustment of threshold value. The pre-processing (S1201) is performed on the image information obtained as imaging output of the CCD video camera 201 during the input/selection indication on the input sheet 209 as made by the user.

Next, position correction processing (S1202) is begun by detecting a positional shift as shown in FIG. 9 based on the image information of the position correction mark provided in the category area C at the four corners of the input sheet 209. Position correction processing (S1202) proceeds by computing the mathematical transformation of the coordinate system corresponding to the magnitude and direction of the positional shift as described above with reference to FIG. 9. As a result, position-corrected binary image information is obtained.

In the next step, extraction processing (S1203) of the input/selection indication is performed, and then determination processing (S1204) of the input/selection indication is performed.

Figure 13:
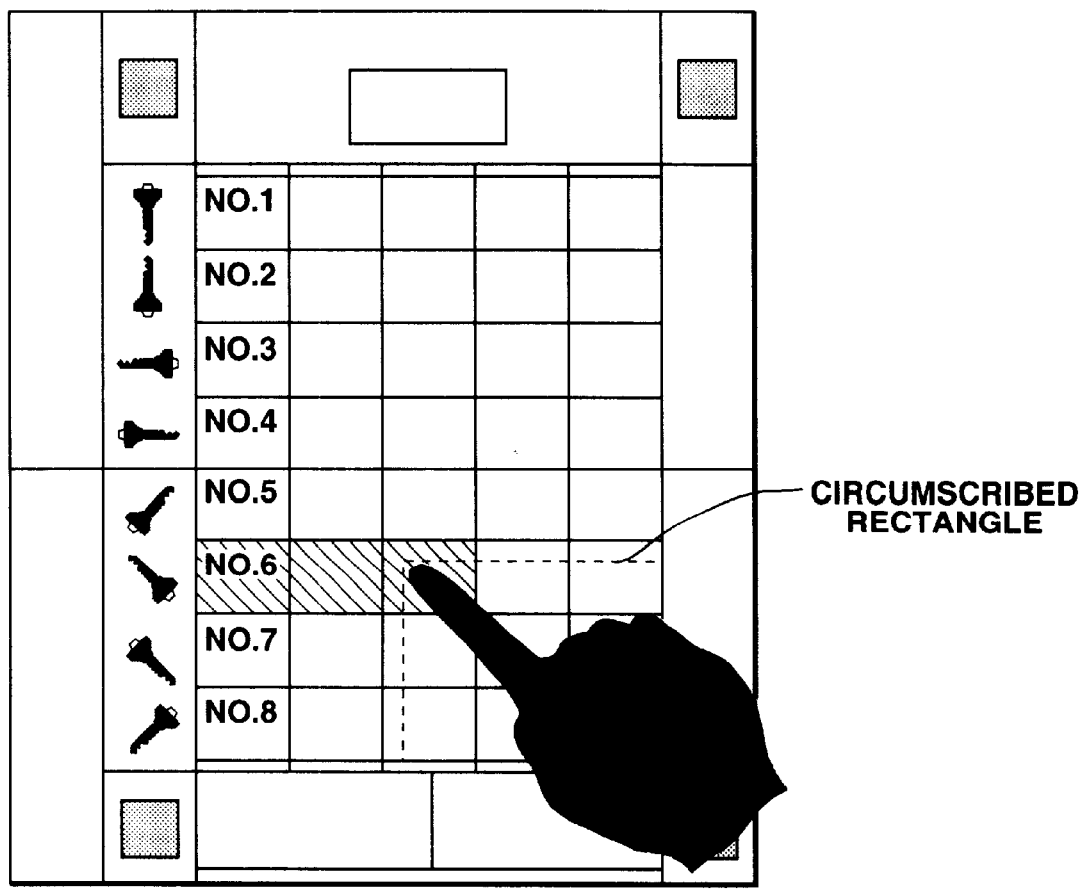
FIG. 13 is an illustration depicting an access indication input pattern giving an input/selection indication extracted by input/selection indication extraction processing performed by an image recognition unit of an embodiment of an information input apparatus of the present invention.

In the input/selection indication extraction processing (S1203), a pre-stored original image of the input sheet 209 is compared to a variable-density image where the input/selection indication is detected. The position-corrected variable-density image information which, for example, could be a pattern indicated by a finger as shown in FIG. 13, is extracted as a differential image from the original image of the input sheet 209. That is, an access indication input pattern is determined for specifying the input/selection indication. An indication area includes the entire extracted differential image. Thus, a circumscribed rectangle and a pixel distribution within the indication area can be determined.

Next, in the input/selection indication determination processing (S1204), the direction of entry of the pointer into the indication area is determined from the pixel density distribution on each edge of the circumscribed rectangle. Image scanning within the rectangle is carried out relative to the entry direction and thereby the end point position of the pointer is determined. In the example embodiment of FIG. 11, the entry direction of the pointer is found by confirming whether a large number of pixels of high density are distributed on a particular edge of the indication area. The category area E is divided into a plurality of blocks of known area and the image scanning is carried out by scanning for pixels within these blocks based on the pointer entry direction and the corresponding scanning pattern specified in Table 2. Thus, by scanning only the indication area of the image which is divided in to blocks, high-speed detection of the pointer end point within a limited scanning area is enabled.

TABLE 2

| ENTRY DIRECTION | SCANNING PATTERN |
| --- | --- |
| entry from right edge | scanning of left end blocks in rectangle from upper edge |
| entry from left edge | scanning of right end block in rectangle from upper edge |
| entry from upper edge | scanning of lower end blocks in rectangle from left edge |
| entry from lower edge | scanning of upper end blocks in rectangle from left edge |
| entry from upper right edge | scanning of lower left end blocks in rectangle from left edge |
| entry from lower right edge | scanning of upper left end blocks in rectangle from left edge |
| entry from upper left edge | scanning of lower right end blocks in rectangle from left edge |
| entry from lower left edge | scanning of upper right end blocks in rectangle from left edge |

The detected end point position is converted to corresponding command/information, which is transmitted to the control unit 103. In the example shown in FIG. 13, the end point position of the finger is converted to the corresponding area number "6". In FIG. 13, the area indicated by cross hatching is a block within the category area E corresponding to the area number "6".

Finally, the control unit 103 executes processing corresponding to the area number "6" which is defined in the command configuration information contained in the retrieved associated information of the identified input sheet 209 stored in the temporary storage unit of the control unit 103.

Therefore, in the information input apparatus 100, authentication processing is performed by image recognition of the recognition target pattern provided on an input sheet 209. That is, a static medium can be used as the recognition target and an association between the recognition target and corresponding information can be made. The access indication input specifying the associated information is detected by image recognition of the access indication input pattern. Thus, dynamic access of information can be carried out using a recognition target displayed on a static medium.

Figure 14:
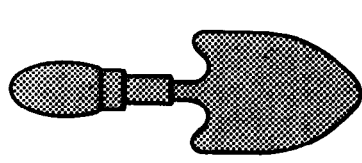
FIG. 14 is an illustration depicting a second example of rotated icons described on the input sheet of FIG. 4
Figure 14:
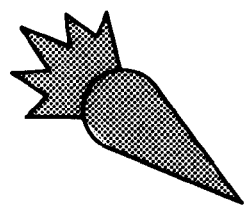
Figure 14:
Figure 14:
Figure 14:
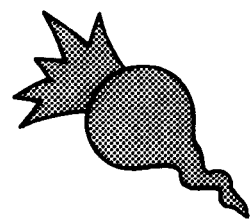
Figure 14:
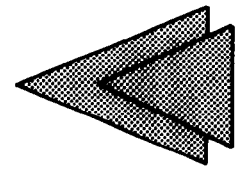
Figure 15A:
FIG. 15A is an illustration depicting different formats of one dimensional bar codes used with input systems of the prior art.
Figure 15A:
Figure 15A:
Figure 15A:
Figure 15A:
Figure 15A:
Figure 15A:
Figure 15B:
FIG. 15B is an illustration depicting a two dimensional bar code used with input systems of the prior art.

The recognition target pattern is not limited to a key-shaped pattern as in the above described embodiment. It can be any distinct pattern with some directionality. Therefore, by combining the shape and the orientation of other recognition patterns, for example, as shown in FIG. 14, an infinite number of different types of input sheets 209 can be defined.

Also, after recognition of the input sheet 209, the input/selection indication may be performed by merely pointing with a finger to the desired input/selection indication contents of the input sheet 209. Thus, the information input/output/selection operation may be easily carried out without directly becoming aware of the hardware, and the input/selection indication contents can be associated with specified information from among a very large volume of data.

In addition, in the above-described embodiment, the center of mass of a variable density level and the circumscribed rectangle of an icon's image are used for recognition of the rotated icon code. However, the orientation with respect to a prepared template image may be found by matching processing.

In an information input method according to the present invention, a recognition target pattern having a rotation mode in which a code is defined by an orientation is appended onto an object surface, and in response, code information corresponding to the rotation mode of the recognition target pattern is inputted by image recognition of the recognition target pattern. Thus, many different of code values, corresponding to the different rotation modes, can be generated for a given recognition target pattern. Further, the number of code values can be significantly increased.

An information input sheet according to the present invention has a display area having at least an area in for input information and an identification area for an identification code of the input information. In the display area, the identification code of the input information is embodied as a recognition target pattern having a rotation mode in which a code is defined by an orientation. Thus, many identification code values are available for a given recognition target pattern, so that the number of unique identifiers per unit area is significantly increased.

Also, in an information input sheet according to the present invention, because a position correction area is provided at a plurality of locations in the display area, and each position correction area including a position correction mark, information for performing position correction during the image recognition processing can be determined from any of the position correction marks.

Also, in an information input device according to the present invention, the use of an input sheet with a plurality of position correction marks insures that the recognition target pattern of a particular input is accurately perceived by the information input apparatus. Thus, the security of the recognition process and overall system is maintained by preventing a recognition target pattern from being misperceived as the recognition target pattern of a different sheet as the result of a position error.

An information input apparatus according to the present invention includes an information input sheet. The information input sheet includes a display area having at least an input information area in which input information is provided. The display area of the information input sheet also includes at least one identification area in which an identification code of the input information is provided. The identification code of the input information is embodied in the display area as a recognition target pattern. The target pattern includes a rotation mode characteristic which is defined by the directional orientation of the target pattern. Imaging information is obtained by imaging the information input sheet with an image pickup unit. The recognition target pattern on the information input sheet is recognized by an image recognition unit processing the imaging information output by the image pickup unit. Based on the imaging information of the identification area, the rotation mode of the recognition target pattern is determined. As mentioned above, the rotation mode of the target pattern specifies an identification code of the information input sheet. Once this determination has been made and the information input sheet has been identified, information entered via the information input sheet is authenticated by authentication processing means. Thus, information may be securely entered using an identified information input sheet. Also, many different identification code values, corresponding to the different rotation modes, can be generated using just one recognition target pattern on the information input sheet. Thereby, number of identification codes available for identifying different objects are significantly increased.

Thus, the present invention provides an information input apparatus, an information input method, and an information input sheet which the user can easily operate without directly becoming aware of hardware. In addition, the present invention enables direct association of a small, simple interface with particular information contained within a large volume of data. By simple operations the user is able to directly access the desired information. The present invention also enables a significant increase in the number of unique identifiers per unit area for use in the identification of goods and articles.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An information input method comprising the steps of:

appending a target pattern to an object surface, the target pattern having a rotation mode wherein a code is defined by an orientation of the target pattern; and inputting code information corresponding to the rotation mode of the target pattern by image recognition of the target patterns wherein the orientation of the target pattern is determined relative to a position correction mark appended to the object surface.

2. An information selection medium in an information input apparatus comprising:

a display area including
an input information area in which input information is provided; and
an identification area in which an identification code of the input information is provided, wherein the identification code of the input information provided in the identification area of the display area includes a target pattern having a rotation mode in which a code is defined by an orientation of the target pattern, wherein the display area further includes one or more position correction areas distributed over the display area, each position correction area including a position correction mark.

3. An information input apparatus comprising:

an information input sheet including a display area having an input information area in which input information is provided and an identification area in which an identification code of the input information is provided, and wherein the identification code of the input information includes a target pattern having a rotation mode in which a code is defined by an orientation of the target pattern;

an image pickup unit for imaging the display area of the information input sheet and generating corresponding imaging information;

an image recognition unit for performing image recognition on the target pattern using the imaging information from the image pickup unit wherein the imaging information includes an image of the identification area of the display area of the information input sheet; and processing means for determining the rotation mode of the target pattern as recognized by the image recognition unit so as to determine the identification code of the information input sheet and authentication information included on the information input sheet, wherein the information input sheet includes one or more position correction areas distributed over the input sheet and each position correction area includes a position correction mark, and wherein the image recognition unit includes Position correcting processing of the target pattern using the imaging information from the image pickup unit wherein the imaging information includes an image of the position correction areas of the display area of the information input sheet.

4. An information input method comprising the steps of:

appending a target pattern to an object surface, the target pattern having a rotation mode wherein a code is defined by an orientation of the target pattern;

inputting code information corresponding to the rotation mode of the target pattern by image recognition of the target pattern; and performing a control operation in response to the inputting of the code information.

5. The method of claim 4, wherein the orientation of the target pattern is determined relative to a position correction mark appended to the object surface.

6. An information selection medium for use with an information input apparatus comprising:

a display area including
   an input information area in which input information is provided; and
   an identification area in which an identification code of the
input information is provided, wherein the identification code of the input information provided in the identification area of the display area includes a target pattern having a rotation mode in which a code is defined by an orientation of the target pattern, and wherein the information input apparatus includes a control means for receiving input information from the input information area and for performing a control operation corresponding to the input information.

7. The information input sheet of claim 6, wherein the display area further includes one or more position correction areas distributed over the display area, each position correction area including a position correction mark.

8. An information input apparatus comprising:

an information input sheet including a display area having an input information area in which input information is provided and an identification area in which an identification code of the input information is provided, and wherein the identification code of the input information includes a target pattern having a rotation mode in which a code is defined by an orientation of the target pattern;

an image pickup unit for imaging the display area of the information input sheet and generating corresponding imaging information;

an image recognition unit for performing image recognition on the target pattern using the imaging information from the image pickup unit wherein the imaging information includes an image of the identification area of the display area of the information input sheet;

processing means for determining the rotation mode of the target pattern as recognized by the image recognition unit so as to determine the identification code of the information input sheet and authentication information included on the information input sheet; and control means for receiving the identification code from the processing means and for performing a control operation corresponding to the identification code.

9. The apparatus of claim 8, wherein the information input sheet includes one or more position correction areas distributed over the input sheet and each position correction area includes a position correction mark, and wherein the image recognition unit includes position correcting processing of the target pattern using the imaging information from the image pickup unit wherein the imaging information includes an image of the position correction areas of the display area of the information input sheet.

\* \* \* \* \*